United States Patent [19]

Kakeno et al.

[11] Patent Number: 4,524,365

[45] Date of Patent: Jun. 18, 1985

[54] RECEPTACLE FOR WASTE INK COLLECTION IN INK JET RECORDING APPARATUS

[75] Inventors: Sadao Kakeno; Minoru Ameyama, both of Yokohama; Kenichi Ichikawa, Tokyo; Michio Umezawa, Kawasaki; Tomoyuki Yamaguchi, Chiba, all of Japan

[73] Assignee: Ricoh Company, Ltd., Tokyo, Japan

[21] Appl. No.: 528,306

[22] Filed: Aug. 31, 1983

[30] Foreign Application Priority Data

Sep. 3, 1982 [JP] Japan ................................ 57-154449

[51] Int. Cl.³ ............................................ G01D 15/16

[52] U.S. Cl. .................................. 346/75; 346/140 R

[58] Field of Search .................. 346/75, 140; 401/196, 401/198, 200, 202

[56] References Cited

U.S. PATENT DOCUMENTS 3,618,609 11/1971 Glick ............................ 15/159 A X
3,881,828 5/1975 Jones .............................. 401/198 X
3,930,258 12/1975 Dick ............................... 346/140 X
4,024,548 5/1977 Alonso .............................. 346/140
4,383,263 5/1983 Ozawa ............................... 346/140

*Primary Examiner*—Joseph W. Hartary
*Attorney, Agent, or Firm*—David G. Alexander

[57] ABSTRACT

A disposable container for collecting waste liquid is disclosed. A casing has therein an absorption member for absorbing waste liquid toward the interior of the casing, and a liquid holding member held in contact with the absorption member to retain the waste liquid absorbed by the absorption member. The receptacle is applicable to an ink jet recording apparatus for collecting waste ink. A fresh ink container may be combined with the waste ink receptacle in an integral cartridge configuration to be mounted in an ink jet recorder.

4 Claims, 10 Drawing Figures

RECEPTACLE FOR WASTE INK COLLECTION IN INK JET RECORDING APPARATUS

BACKGROUND OF THE INVENTION

The present invention relates to receptacles applicable to various apparatuses for the purpose of discarding waste liquid and, more particularly, to a waste ink collection receptacle used with an ink jet recording apparatus to discard ink which cannot serve data printout any more.

In an ink jet recording apparatus, ink drops which do not contribute to data printout are usually collected by a gutter to be returned to an ink supply line for reuse. Because the ink so collected and repeatedly used has its density and viscosity progressively varied to fail to satisfy certain conditions for separation into drops, the ink collected by the gutter has to be discarded at suitable time intervals without being returned to the ink supply line.

Meanwhile, in a recorder of the type concerned, small drops of ink, usually called satellites and which do not join in the data printout, tend to be formed during operation of the recorder. The satellites, as well as ink mist appearing at the start and stop of ink ejection due to on-off actions of a solenoid-operated valve, have to be effectively collected and discarded because they would smear the apparatus and/or a recording sheet.

A receptacle has been used with an ink jet recorder in order to collect and temporarily store the undesirable ink therein. For example, Japanese Patent Laid Open Publication No. 53-97428 discloses a waste ink receptacle which has a mass of cotton or like absorption member packed therein for absorbing waste ink. A problem encoutered with such a receptacle is that the absorption member cannot readily hold a quantity of absorbed ink therein and, when the receptacle is attached to or detached from a recorder, tends to cause the ink to fall in drops to smear the recorder and adjacent object.

Meanwhile it has been customary to fix a waste ink receptacle to a recorder by rotating it and, therefore, to employ a cylindrical configuration for the receptacle. Therefore, it has been impossible to install a receptacle having a maximum capacity within the limited space available in the recorder. Additionally, attachment and detachment of such a receptacle to and from a recorder has not always been easy.

SUMMARY OF THE INVENTION

It is therefore an object of the present invention to provide a receptacle which is capable of collecting waste liquid and effectively holding it thereinside.

It is another object of the present invention to provide an improved receptacle for use with an ink jet recording apparatus which has a unique construction for collecting waste ink and holding it effectively thereinside.

It is another object of the present invention to provide an ink receptacle cartridge for use with an ink jet recording apparatus which is capable of easily and positively loading a waste ink receptacle and a fresh ink container in the recorder.

It is another object of the present invention to provide a generally improved receptacle for waste ink collection in an ink jet recording apparatus.

The above and other objects, features and advantages of the present invention will become apparent from the following detailed description taken with the accompanying drawings.

A receptacle for collecting waste liquid of the present invention comprises a casing, an absorption member disposed in the casing to collect and absorb waste liquid, and a liquid holding member disposed in the casing in contact with the absorption member to retain the waste liquid absorbed by the absorption member.

In accordance with the present invention, a disposable container for collecting waste liquid is disclosed. A casing has therein an abosorption member for absorbing waste liquid toward the interior of the casing, and a liquid holding member held in contact with the absorption member to retain the waste liquid absorbed by the absorption member. The receptacle is applicable to an ink jet recording apparatus for collecting waste ink. A fresh ink container may be combined with the waste ink receptacle in an integral cartridge configuration to be mounted in an ink jet recording apparatus.

DESCRIPTION OF THE PREFERRED EMBODIMENTS

While the receptacle for waste ink collection in an ink jet recorder of the present invention is susceptible of numerous physical embodiments, depending upon the environment and requirements of use, substantial numbers of the herein shown and described embodiments have been made, tested and used, and all have performed in an eminently satisfactory manner.

Figure 1:
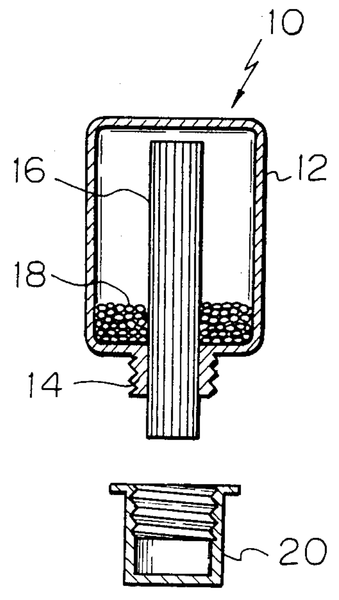
FIG. 1 is a section of a receptacle embodying the present invention and applied to an ink jet recording apparatus.

Referring to FIG. 1 of the drawings, a receptacle embodying the present invention is shown and generally designated by the reference numeral 10. The receptacle 10 is assumed to be designed for use with an ink jet recorder for collecting waste ink. As shown, the receptacle 10 comprises a hollow casing 12 having a neck which is formed with an opening 14 therethroughout. An elongate absorption member 16 is made of a fibrous material for capillarity and accommodated in the casing 12 to partly protrude from the opening 14. A liquid holding member 18 made of resin is disposed in the casing 12 in contact with the absorption member 16. A cap 20 is associated with the casing 12 to stop the opening 14 when the receptacle is removed from the recorder.

Figure 2:
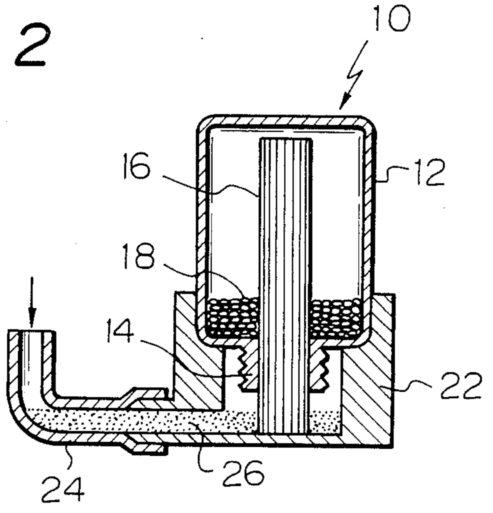
FIG. 2 is a section of the receptacle which is loaded in the recorder.

The receptacle 10 is shown in FIG. 2 in its position loaded in a socket section 22 of the recorder. Waste ink 26 is routed to the socket section 22 through a valved waste ink passageway 24. The absorption member 16 absorbs the ink upwardly into the casing 12 by capillarity whereafter the holding member 18 positively retains the ink within the casing 12 in a gelled state. The ink in the casing 12, therefore, will be prevented from falling in drops when the receptacle 10 is mounted to or demounted from the recorder.

Figure 3:
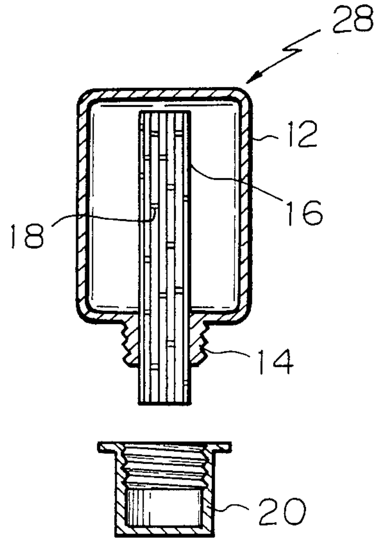
FIG. 3 is a section of a receptacle in accordance with a second embodiment of the present invention and also applied to an ink jet recording apparatus.

Referring to FIG. 3, a receptacle 28 in accordance with a second embodiment of the present invention is shown. The receptacle 28 is distinguishable from the receptacle 10 by the holding member 18 which is retained in the absorption member 16. In the aspect of the function, the receptacle 28 shares the same principle with the receptacle 10.

In the first and second embodiments described, the holding member 18 should preferably comprise a material which is capable of absorbing water, or ink, by an amount 100 times or preferably 200 times heavier than its own weight. Typical examples of such a material may be, but not limited to, starch-based acrylonitrile graft hydrolysates, startch-based acrylic acid graft compositions, cellulose-based graft polymers, cellulose-based carboxymethylated substances, and synthetic resins such as polyacrylates. Such materials are commercially available as typified by SUNWET IM-300 (Sanyo Kasei), AQUAKEEP 4S (Seitetsu Kagaku Kogyo), and AQUAKEEP 10SH (Seitetsu Kagaku Kogyo).

For the absorption member 16, too, various materials are usable which include a mass of filaments such as woven cloth or felt, sponge, rubber, foamed plastics or like material having an intercommunicated foam structure, a sheet exemplified by blotting paper, filter paper, membrane filter or porous synthetic sheet, a porous sintered body of metal filaments, metal powder or resin powder, and ceramics.

As described above, the principle underlying the present invention resides in the effective combination of two different kinds of members: an absorption member for absorbing waste ink due to capillarity, and an absorptive resinous member for retaining the ink absorbed the absorption member. This trims the size and costs of the entire receptacle while successfully preventing the ink from spilling when the receptacle is attached to or detached from the recorder, thereby safeguarding the recorder against smearing.

Should the receptacle employ only the absorption member having the capillary property, such a member would be required in a significant amount to suck ink into the casing at the sacrifice of dimensions and costs. The combined use of two different kinds of absorption members in accordance with the present invention realizes an absorption capability which amounts to 100 to 1000 times the total amount of the absorption members. This translates into a compact and economical design of the receptacle.

Figure 4:
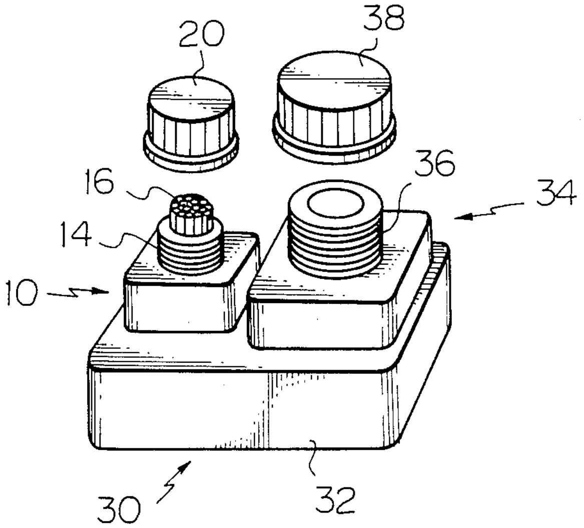
FIG. 4 is a perspective view of a cartridge in which the receptacle shown in FIG. 3 may be integrally assembled together with a fresh ink container.
Figure 5:
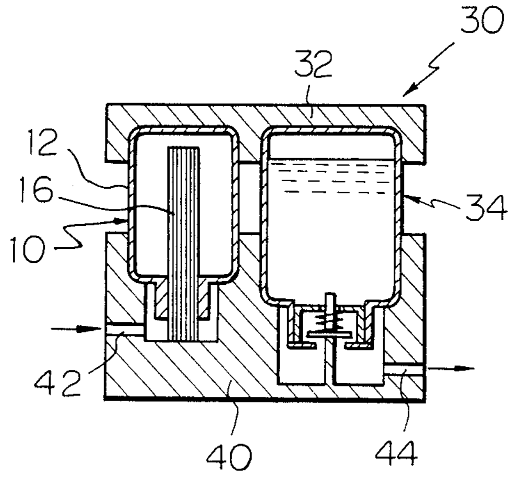
FIG. 5 is a section of the cartridge shown in FIG. 4 loaded in the recorder.

Referring to FIGS. 4 and 5, any one of the receptacles described above forms may be combined with a fresh ink container in an integral cartridge construction. As shown, an ink cartridge 30 comprises a frame 32 which is adapted to integrally connect the waste ink receptacle 10 with a fresh ink container 34. The fresh ink container 34 has a supply opening 36 and a cap 38 for closing the opening 36.

As shown in FIG. 5, the ink cartridge 30 is constructed to be easily yet positively fit in a socket section 40 defined in an ink jet recorder or the like for receiving it. The socket section 40 is formed with a passageway 42 for incoming waste ink and a passageway 44 for outgoing fresh ink. In such a construction, waste ink routed through the passageway 42 is absorbed by the receptacle 10 while fresh ink from the container 30 is fed out by the passageway 44 to a pump or the like.

With the integral cartridge type configuration described above, the waste ink is absorbed by the receptacle 10 by an amount proportional to an amount of fresh ink supply. The operator, therefore, needs only to replace the receptacle 10 with new one when he or she replaces the fresh ink container finding it empty. This frees the operator from part of the maintenance related to the charge and discharge of ink, thereby enhancing operationability.

Figure 6:
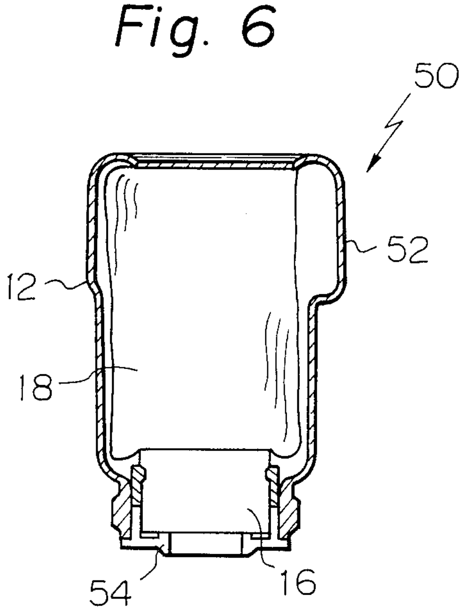
FIG. 6 is a section of a receptacle in accordance with a third embodiment of the present invention also applied to an ink jet recording apparatus.

Referring to FIG. 6, a receptacle 50 in accordance with a third embodiment of the present invention is shown which is essentially similar to the first embodiment in construction and function. As shown, the receptacle has a casing 52 which is formed with an opening 54 throughout its neck. The absorption member 16 is disposed the casing 52 adjacent to the opening 54, while a holding member 18 is also disposed in the casing 52 in physical contact with the absorption member 16. As previously stated, a variety of materials are available for each of the coactive members 16 and 18.

Figure 7:
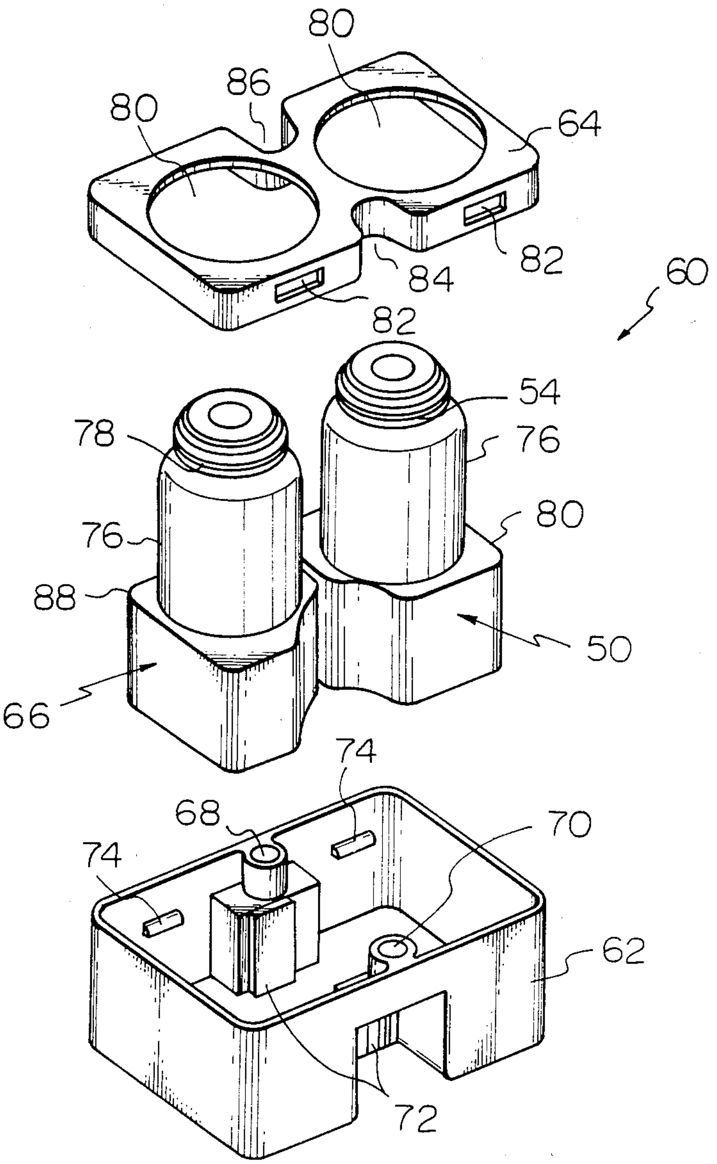
FIG. 7 is an exploded perspective view of a cartridge in which the receptacle shown in FIG. 6 may be assembled together with a fresh ink receptacle.
Figure 8:
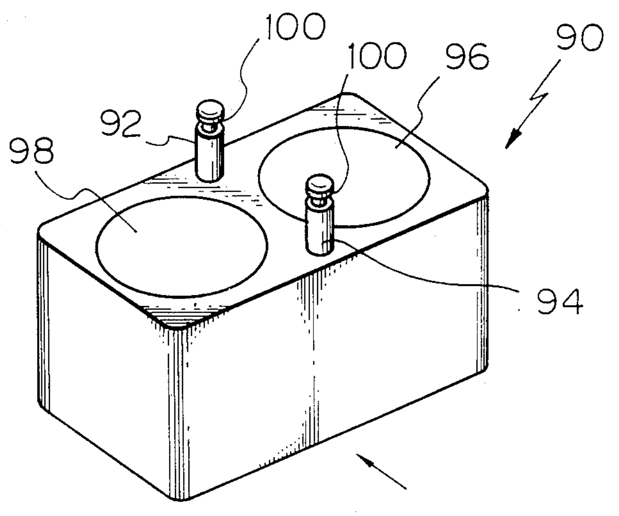
FIG. 8 is a perspective view of an example of a socket section where the cartridge of FIG. 7 may be fixed to the recorder.

Again, the receptacle 50 shown in FIG. 6 may be combined with a fresh ink container in an integral cartridge structure as shown in FIGS. 7–9. As best shown in FIG. 7, the ink cartridge, generally 60, comprises a casing 62, an inner casing 64, the receptacle 50 and a fresh ink container 66. The casing 62 is formed with guide holes 68 and 70 in its longitudinally opposite intermediate positions. The hole 68 and 70 are different in diameter from each other. Fixing pawls 72 individually extend in the depthwise direction of the casing 62 and each has its one end slightly protruded radially into the guide hole 68 or 70. The pawls 72 are so configured as to deform when depressed from the outside of the casing 62. Also formed on the inner periphery of the casing 62 are four projections 74, two at opposite sides of the guide hole 68 and the other two at opposite sides of the guide hole 70.

The waste ink receptacle 50 and fresh ink container 66 individually have casings 76 which are identical in having a modified rectangular lower portion and a cylindrical upper portion. The fresh ink container 66 has an opening 78 at its top as the waste ink receptacle 50 does as described.

The inner casing 64 is formed with openings 80, four rectangular apertures 82 coactive with the projections 74 on the casing 62 as will be described, and constricted portions 84 and 86 located in a longitudinally intermediate area to extend toward each other.

In assembly, after the fresh ink container 66 and waste ink receptacle 50 have been put into the casing 62 to face each other, the inner casing 64 is pushed into the casing 62 from above the containers 66 and 50 until its rectangular apertures 82 lockingly receive the projections 74 on the casing 62. Shoulders 88 of the containers 66 and 60 are individually dimensioned such that they are pressed from above by the inner casing 64 fit in the casing 62, so that both the containers are firmly secured to the casing 62 to complete the ink cartridge 60.

Referring to FIG. 8, there is shown a socket section 90 formed in a pump to receive the ink cartridge 60 described above with reference to FIG. 7. Two guide pins 92 and 94 having different diameters are studded on the socket section 90. Holes 96 and 98 are formed in the socket section 90 to receive the fresh ink container 66 and waste ink receptacle 50, respectively. Each of the guide pins 92 and 94 has a top shaped in a triangular pyramid and a circumferential recess or groove 100 just below the top.

The ink cartridge 60 shown in FIG. 7 is installed in the socket section 90 with its openings 78 and 54 faced downward and the guide holes 68 and 70 aligned with the guide pins 92 and 94. As the ink cartridge 60 is pushed downwardly in such a position, the pawls 72 on the casing 62 are progressively cammed out of the guide holes 68 and 70 by the tops of the guide pins 92 and 94 and, then, caused to snap into the grooves 100 formed in the guide pins 92 and 94. The ink cartrideg 60 is now secured to the socket section 90.

Figure 9A:
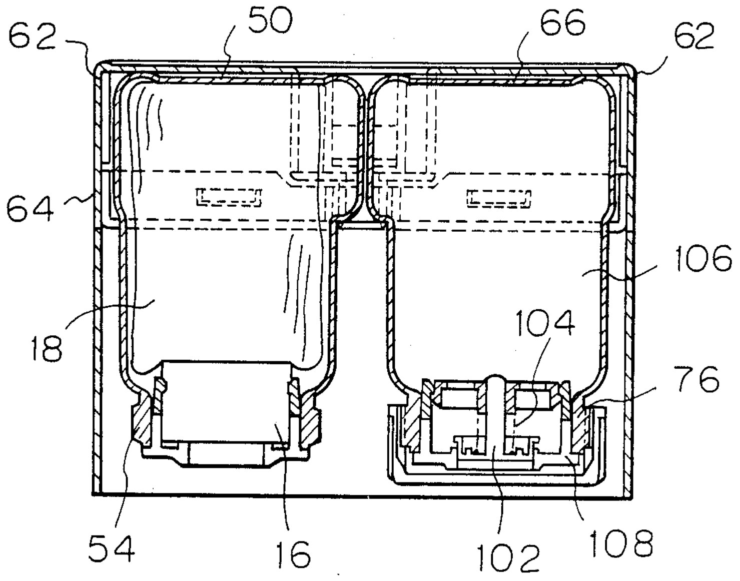
FIGS. 9*a* and 9*b* are sections showing a waste ink receptacle and a fresh ink container combined in a cartridge configuration.

In FIG. 9*a*, the containers of the ink cartridge 60 mounted in the socket section 90 are shown in a sectional view. As previously described, the ink cartridge 60 has the fresh ink container 66 and waste ink receptacle 50 fixed together by the inner casing 64 with the casing 62. The container 66 includes a valve 102 urged by a spring 104 into contact with an inner stopper casing 108, so that the interior of the container 66 is sealed from the outside when the container 66 is not used. Such an inner stopper unit is press fit in the opening 78 of the container 66.

Figure 9B:
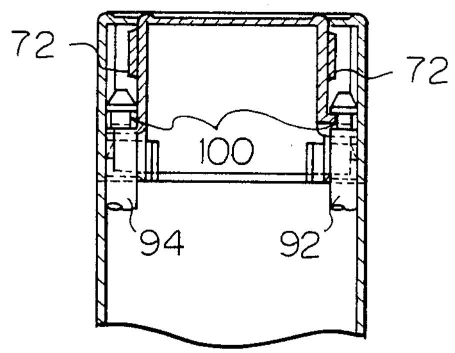

Shown in FIG. 9*b* is the position of the ink cartridge and socket section in which the guide pins 92 and 94 are respectively received in the guide holes 68 and 70. In this position, the pawls 72 protruding into the guide holes 68 and 70 are individually engaged in the grooves 100 of the guide pins 92 and 94 thereby locking the casing 62 of the ink cartridge 60 to the socket section 90.

To remove the cartridge 60 from the socket section 90 for replacement or the like, the pawls 72 on the cartridge casing are manually pushed toward each other from the outside until the ends of the pawls 72 become released from the grooves 100 in the guide pins 92 and 94. Under this condition, the cartridge can be easily pulled upwardly out of the socket section 90.

It will be recalled that the guide holes 68 and 70 are designed with different diameters and so are the guide pins 92 and 94, as shown in FIGS. 7 and 8. Although constituting no essential part of the present invention, such a difference in diameter will effectively prevent the cartridge from being inadvertently placed in the socket section with its lateral orientation inverted.

If desired, the difference in diameter may be substituted for by a difference in shape, that is, forming one in a cylinder and the other in a prism, for example.

As described above, the ink cartridge shown in FIGS. 7–9 features a significant positioning accuracy which elminates shake or dislocation of the cartridge after its installation in the socket section. Meanwhile, the cartridge can be locked merely by pushing it into the socket section and released therefrom merely by pulling it while pushing the pawls.

Where the guide pins and guide holes are designed to allow the cartridge to be mounted in the receiver section in a specific orientation only, one is prevented from misorienting the cartridge in the lateral direction.

It will be apparent that even the receptacle shown in any one of FIGS. 1–3 can be built in a cartridge in the manner shown in FIGS. 7 and 8. It will also be apparent that the receptacle shown in FIG. 6 may be placed in a recorder as illustrated in FIG. 2 or 5.

While the present invention has been shown and described in conjunction with an ink jet recorder, such is only illustrative and may be replaced by any other application which needs a measure against waste liquid.

Various modifications will become possible for those skilled in the art after receiving the teachings of the present disclosure without departing from the scope thereof.

What is claimed is:

1. An ink cartridge for an ink jet recording apparatus, comprising:
 - a cartridge casing for accommodating a fresh ink supply container and a waste ink collecting receptacle, said cartridge casing being formed with a plurality of guide holes and a plurality of fixing pawls; and
 - a unit for rigidly supporting the cartridge casing, said unit being provided with a plurality of guide pins each of which is formed with a recess, said cartridge casing being locked to said unit when leading ends of the fixing pawls are individually engaged in the recesses of the guide pins.

2. The receptacle as claimed in claim 1, in which at least one of the guide pins engagable in the guide holes has a shape different from that of the others.

3. The receptacle as claimed in claim 1, in which at least one of the guide pins engagable in the guide holes has a radius different from that of the others.

4. The receptacle as claimed in claim 1, further comprising an inner casing for securely retaining the fresh ink container and the waste ink collecting receptacle in the cartridge casing.

* * * * *